Oct. 6, 1925.                                                    1,556,240
J. T. MORRISSEY
HANDLING DEVICE
Filed Oct. 25, 1923
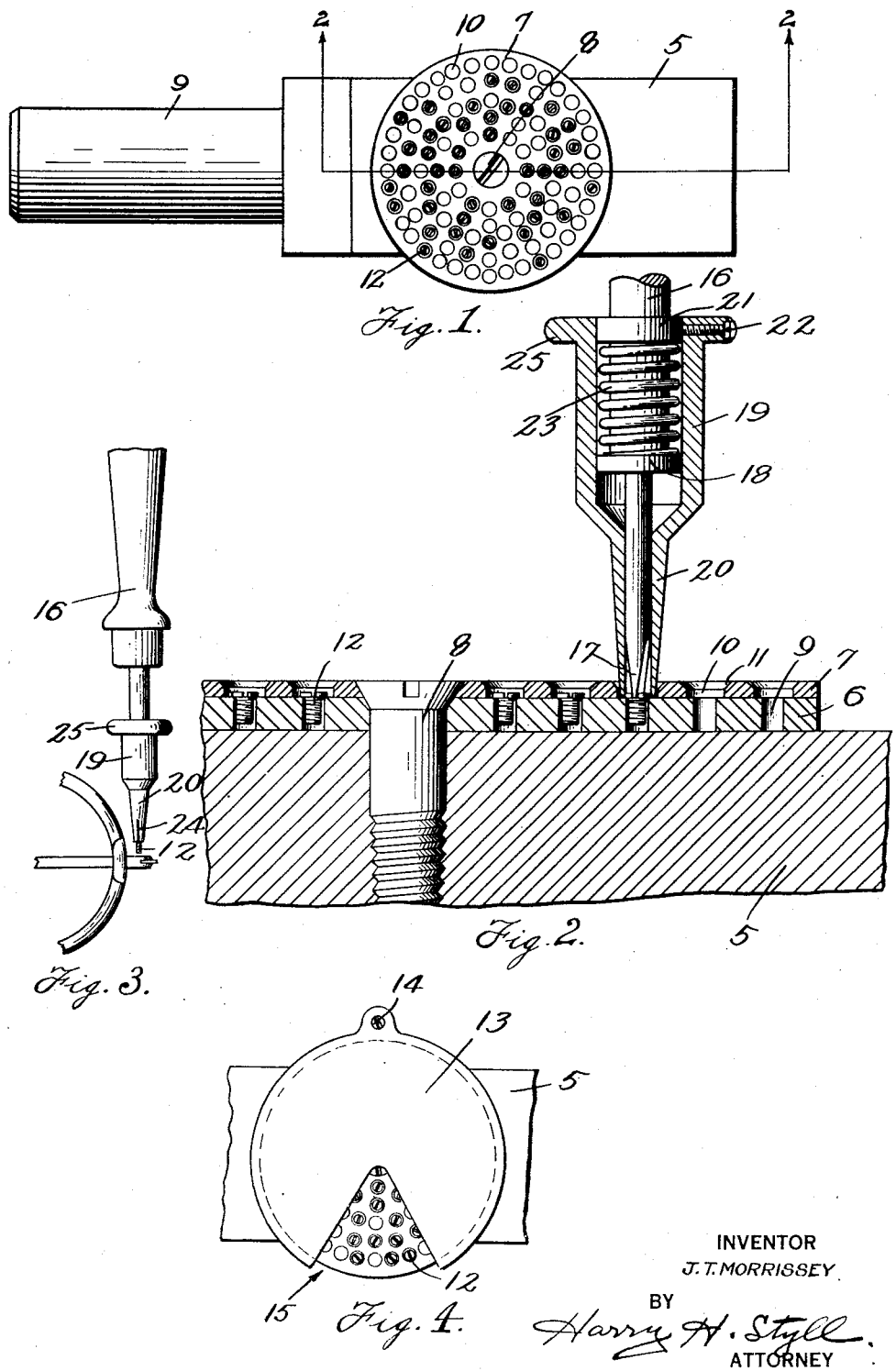
INVENTOR
J. T. MORRISSEY
BY
Harry H. Styll
ATTORNEY Patented Oct. 6, 1925.

1,556,240

UNITED STATES PATENT OFFICE.

JAMES T. MORRISSEY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

HANDLING DEVICE.

Application filed October 25, 1923. Serial No. 670,805.

*To all whom it may concern:*

Be it known that I, JAMES T. MORRISSEY, a citizen of the United States, residing at Southbridge, in the county of Worcester and State of Massachusetts, have invented certain new and useful Improvements in Handling Devices, of which the following is a specification.

This invention relates to handling devices, and has reference to the handling of small screws, rivets, bolts, and the like, and particularly to small screws used in the optical trade in spectacle and eyeglass mountings.

An important object of the invention is to provide a handling device of this character that will greatly facilitate the handling of the small screws used in such mountings, and that will expedite the assembling or repairing thereof.

Another very important object of the invention is to provide a device of this nature that is strong, durable, very simple and inexpensive in construction, and that is well adapted to the usage for which it is designed.

Other objects and advantages of the invention will become apparent during the course of the following description.

In the drawings, wherein like numerals are employed to designate like parts throughout the same:

Figure 1 is a top plan view of a portion of the invention.

Figure 2 is a vertical section of the handling device, being taken substantially on line 2—2 of Figure 1.

Figure 3 is a front elevation of a portion of the device in use.

Figure 4 is a top plan view of a portion of the invention illustrating the same provided with a cover.

In the drawings, wherein for the purpose of illustration is shown the preferred embodiment of my invention, the numeral 5 designates a block or suitable base for the apertured plates 6 and 7, respectively, which are mounted thereon by means of the screw 8. The block 5 may be of the ordinary construction and may be provided with the reduced cylindrical portion 9, by which means the block 5 may be rigidly clamped in any desired location.

I have found it desirable to use the two plates 6 and 7, the plate 6 having the comparatively small transversely extending apertures which are adapted to align with the comparatively enlarged apertures 10 of the plate 7, the plate 7 being chamfered as at 11, around the apertures 10. It will, of course, be seen, however, that if it is desirable a single plate may be used, having the desired openings formed therethrough. The aligned apertures are adapted to receive the screws, or the like, 12, which are to be used. If it is desired the plates 6 and 7 may be so mounted that they may be rotated about the screw 8 and furthermore a pivoted cover 13 which is pivoted as at 14 and which is provided with the cut-out portion 15, may be disposed above the discs 6 and 7, and in this manner the said discs may be rotated gradually, thereby exposing the screws, as illustrated in Figure 4 of the drawings.

Associated with the disc is an implement similar to a screw-driver, which is designated by the numeral 16. The implement has the usual flattened end 17, the size of which is determined by the size of the screws 12 which are to be used.

The shank of the tool has a collar 18 formed integral therewith, as shown in Figure 2. A tubular sleeve 19 having the reduced portion 20 is slidably mounted on the end of the implement 16. A second collar 21 of the same diameter as the collar 18 is slidably mounted on the implement shank and is adapted to move with the tubular member 19, by reason of the set screw 22 which frictionally engages the same. Interposed between the collars 18 and 21 is a helical spring 23.

Particular attention is called to the fact that the aperture 10 is of sufficient diameter to allow for the insertion of the reduced end 20 of the tubular member 19 therein when the screw 12 is seated as illustrated. To allow for the slight variations in the size of the heads of the screws, the end 20 is split as at 24.

It will thus be seen that in use the screws 12 are placed within the aligned apertures 9 and 10, which operation may be accomplished very quickly. Of course, normally the action of the helical spring 23 will hold the tubular member 19 in a raised position so that the flattened portion 17 will extend beyond the lower end of the reduced portion 20. However, when it is desired to remove a screw or the plates, the top flange 25 of the tubular member is pushed downwardly by the thumb of the user, or otherwise, until the split reduced portion 20 extends beyond the flattened portion 17 slightly and in this way the portion may be inserted within the aperture 10, as illustrated in Figure 2. It will, of course, be seen that it is desirable to have the flattened portion 17 seated within the usual groove found in such screws. When the screw 12 has become seated it may be removed by simply removing the implement 16 and the screw may then be carried to and inserted in the desired location, as for instance as shown in Figure 3 of the drawings. As the flattened portion 17 is seated within the slot the screw may be rapidly put in a tightened position. Obviously this operation is much more simple than the old method heretofore used in view of the fact that the screw is placed in the eyeglass mounting by means of the tubular member and not by the hands of the user.

It is to be understood that the form of my invention herewith shown and described is to be taken as the preferred embodiment of the same, and that various changes in the shape, size and arrangement of parts may be resorted to without departing from the spirit of my invention or the scope of the sub-joined claims.

Having thus described my invention, what I claim is:

1. A device for the handling of screws or the like, comprising a plate with a plurality of openings, each opening having an internal bore, and an external bore of larger diameter, and a shelf between the bores.

2. A device for handling screws or the like, comprising a plate having a plurality of openings, each opening having an internal bore and an external bore of larger diameter, a shelf between the bores, and a flared mouth to the outer bore.

3. A device for the handling of screws or the like, comprising a plate having a plurality of openings therein, and a superimposed plate having a plurality of openings of larger diameter than the first openings, the openings of the two plates being centrally aligned.

JAMES T. MORRISSEY.